United States Patent
Lee et al.

(10) Patent No.: US 9,161,370 B2
(45) Date of Patent: Oct. 13, 2015

(54) METHOD AND DEVICE FOR RESOLVING INTERFERENCE BETWEEN CELLS

(75) Inventors: Youngdae Lee, Gyeonggi-do (KR); Seungjune Yi, Gyeonggi-do (KR); Sungduck Chun, Gyeonggi-do (KR); Sungjun Park, Gyeonggi-do (KR); Sunghoon Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 13/991,954

(22) PCT Filed: Jan. 6, 2012

(86) PCT No.: PCT/KR2012/000176
§ 371 (c)(1),
(2), (4) Date: Jun. 6, 2013

(87) PCT Pub. No.: WO2012/093902
PCT Pub. Date: Jul. 12, 2012

(65) Prior Publication Data
US 2013/0252626 A1  Sep. 26, 2013

Related U.S. Application Data

(60) Provisional application No. 61/430,518, filed on Jan. 6, 2011.

(51) Int. Cl.
*H04W 72/00* (2009.01)
*H04W 72/12* (2009.01)
(Continued)

(52) U.S. Cl.
CPC ......... *H04W 72/1231* (2013.01); *H04J 11/005* (2013.01); *H04W 48/16* (2013.01); *H04W 84/045* (2013.01)

(58) Field of Classification Search
USPC .......... 455/444, 436, 438, 439, 440, 442, 443
See application file for complete search history.

(56) References Cited

U.S. PATENT DOCUMENTS 8,423,008 B2 *  4/2013  Pedersen et al. ............... 455/418
8,731,559 B2 *  5/2014  Shi et al. ....................... 455/436
(Continued)

FOREIGN PATENT DOCUMENTS

KR    10-2010-0048863 A    5/2010
KR    10-2010-0112710 A    10/2010
(Continued)

OTHER PUBLICATIONS

Written Opinion issued in corresponding International Patent Application No. PCT/KR2012/000176 dated Sep. 24, 2012.
(Continued)

*Primary Examiner* — Wayne Cai
*Assistant Examiner* — Said Elnoubi
(74) *Attorney, Agent, or Firm* — Morgan, Lewis & Bockius LLP

(57) ABSTRACT

The present invention relates to a wireless communication system. In particular, the present invention relates to a method for a terminal to measure a signal in a wireless communication system and a device therefor, and comprises: a step for receiving information on a first specific time interval from a first cell after having set the connection with the first cell; a step for receiving a second cell signal through the first specific time interval on the basis of the information; a step for informing the first cell the proximity of a second cell in case the terminal is a member of the second cell; and a step for receiving the second cell signal without basing on the information on the first specific time interval, after informing the first cell of the proximity of the second cell.

8 Claims, 11 Drawing Sheets

(51) Int. Cl.
*H04J 11/00* (2006.01)
*H04W 48/16* (2009.01)
*H04W 84/04* (2009.01)

(56) References Cited

U.S. PATENT DOCUMENTS

2010/0113031 A1 5/2010 Kim et al.
2010/0260052 A1 10/2010 Cho et al.

FOREIGN PATENT DOCUMENTS

KR 10-2010-0113406 A 10/2010
WO 2009-129261 A1 10/2009

OTHER PUBLICATIONS

International Search Report issued in corresponding International Patent Application No. PCT/KR2012/000176 dated Sep. 24, 2012.

* cited by examiner

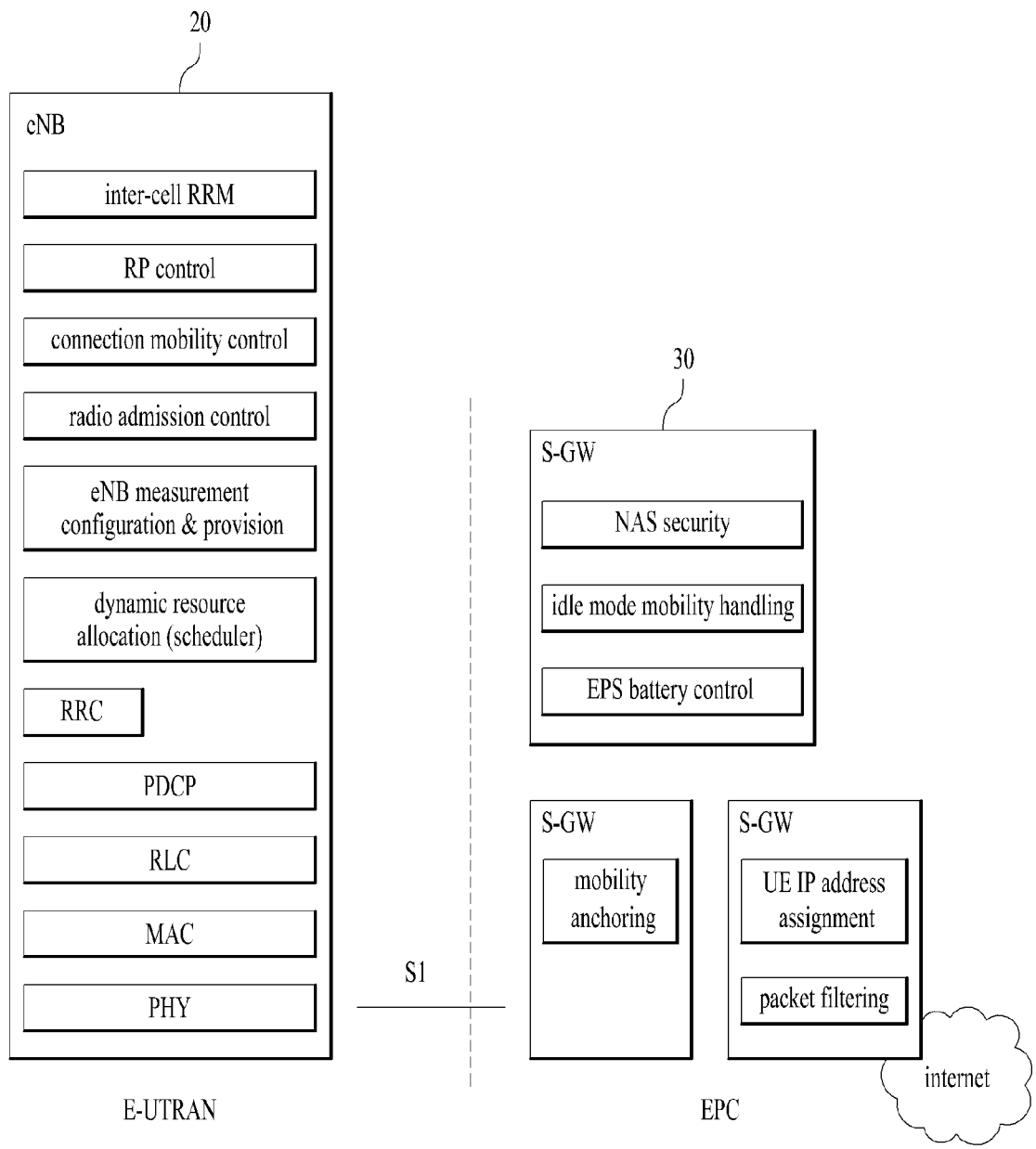

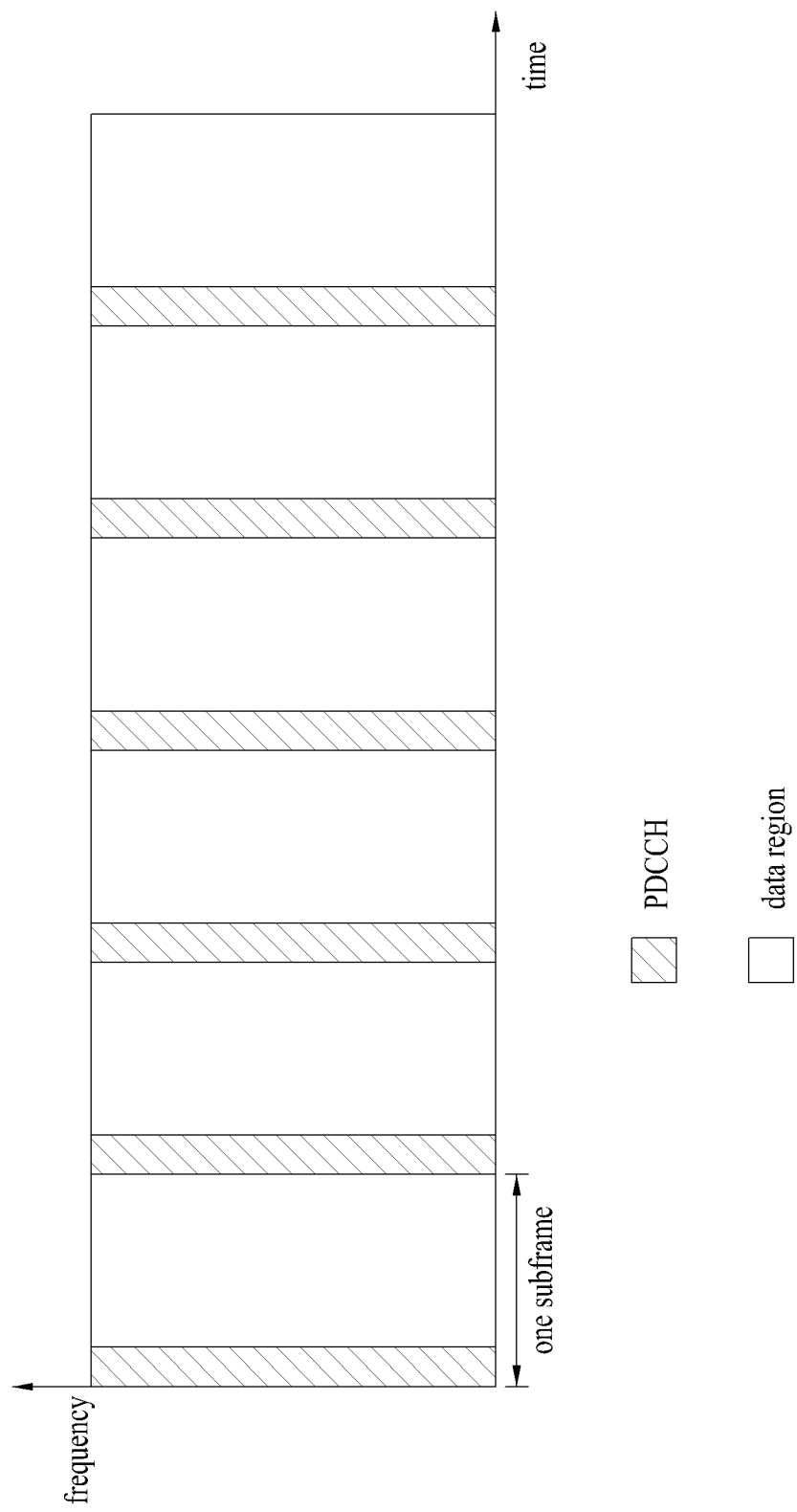

METHOD AND DEVICE FOR RESOLVING INTERFERENCE BETWEEN CELLS

TECHNICAL FIELD

The present invention relates to a wireless communication system, and more particularly, to a wireless communication system including a heterogeneous cell.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Task

One object of the present invention is to provide a method and apparatus for resolving an inter-cell interference.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to a $1^{st}$ embodiment of the present invention, a method of measuring a signal, which is measured by a user equipment in a wireless communication system includes the steps of receiving an information on a $1^{st}$ specific time region from a $1^{st}$ cell in a state of being established a connection with the $1^{st}$ cell, receiving a signal of a $2^{nd}$ cell via the $1^{st}$ specific time region based on the information, if the user equipment corresponds to a member of the $2^{nd}$ cell, informing the $1^{st}$ cell of a proximity of the $2^{nd}$ cell, and receiving the signal of the $2^{nd}$ cell not based on the information on the $1^{st}$ specific time region, after informing the $1^{st}$ cell of the proximity of the $2^{nd}$ cell.

According to a $2^{nd}$ embodiment of the present invention, a user equipment, which is used in a wireless communication system, includes a radio frequency (RF) unit and a processor, wherein the processor is configured to receive an information on a $1^{st}$ specific time region from a $1^{st}$ cell in a state of being established a connection with the $1^{st}$ cell, to receive a signal of a $2^{nd}$ cell via the $1^{st}$ specific time region based on the information, if the user equipment corresponds to a member of the $2^{nd}$ cell, to inform the $1^{st}$ cell of a proximity of the $2^{nd}$ cell, and to receive the signal of the $2^{nd}$ cell not based on the information on the $1^{st}$ specific time region, after informing the $1^{st}$ cell of the proximity of the $2^{nd}$ cell.

Preferably, the $2^{nd}$ cell is a femto cell to which the user equipment is allowed to access or a Closed Subscriber Group (CSG) cell to which the user equipment is allowed to access.

Preferably, the $2^{nd}$ cell is restricted in transmitting a signal on the $1^{st}$ specific time region.

Preferably, if the $1^{st}$ cell orders to remove the information, the user equipment does not use the information on the $1^{st}$ specific time region.

Preferably, the user equipment further includes the step of receiving an information on a $2^{nd}$ specific time region used for receiving the signal of the $1^{st}$ cell, after informing the $1^{st}$ cell of the proximity of the $2^{nd}$ cell.

According to a $3^{rd}$ embodiment of the present invention, a method of measuring a signal, which is measured by a user equipment in a wireless communication system includes the steps of receiving an information on a specific time region from a $1^{st}$ cell in a state of being established a connection with the $1^{st}$ cell, moving from the $1^{st}$ cell to a $2^{nd}$ cell, and receiving a signal of the $1^{st}$ cell or the $2^{nd}$ cell via the specific time region based on the information while maintaining a connection with the $2^{nd}$ cell.

According to a $4^{th}$ embodiment of the present invention, a user equipment, which is used in a wireless communication system, includes a radio frequency (RF) unit and a processor, wherein the processor is configured to receive an information on a specific time region from a $1^{st}$ cell in a state of being established a connection with the $1^{st}$ cell, to move from the $1^{st}$ cell to a $2^{nd}$ cell, and to receive a signal of the $1^{st}$ cell or the $2^{nd}$ cell via the specific time region based on the information while maintaining a connection with the $2^{nd}$ cell.

Preferably, the $1^{st}$ cell or the $2^{nd}$ cell is restricted in transmitting a signal on the specific time region.

Advantageous Effects

According to the present invention, an inter-cell interference in a wireless communication system can be efficiently resolved.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram of an example for a structure of E-UTRAN and a gateway;

FIG. 4 is a diagram of an example for a structure of a downlink physical channel;

BEST MODE

Mode for Invention

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). The UMTS is a $3^{rd}$ generation (3G) asynchronous mobile communication system operating in a Europe system-based wideband code division multiple access (WCDMA), a global system (GSM) for a mobile communication, and a general packet radio service (GPRS). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. And, a specific terminology used in the following description is provided to help the understanding of the present invention and the use of the specific terminology can be modified to a different form within a scope of a technical idea of the present invent.

Figure 1:
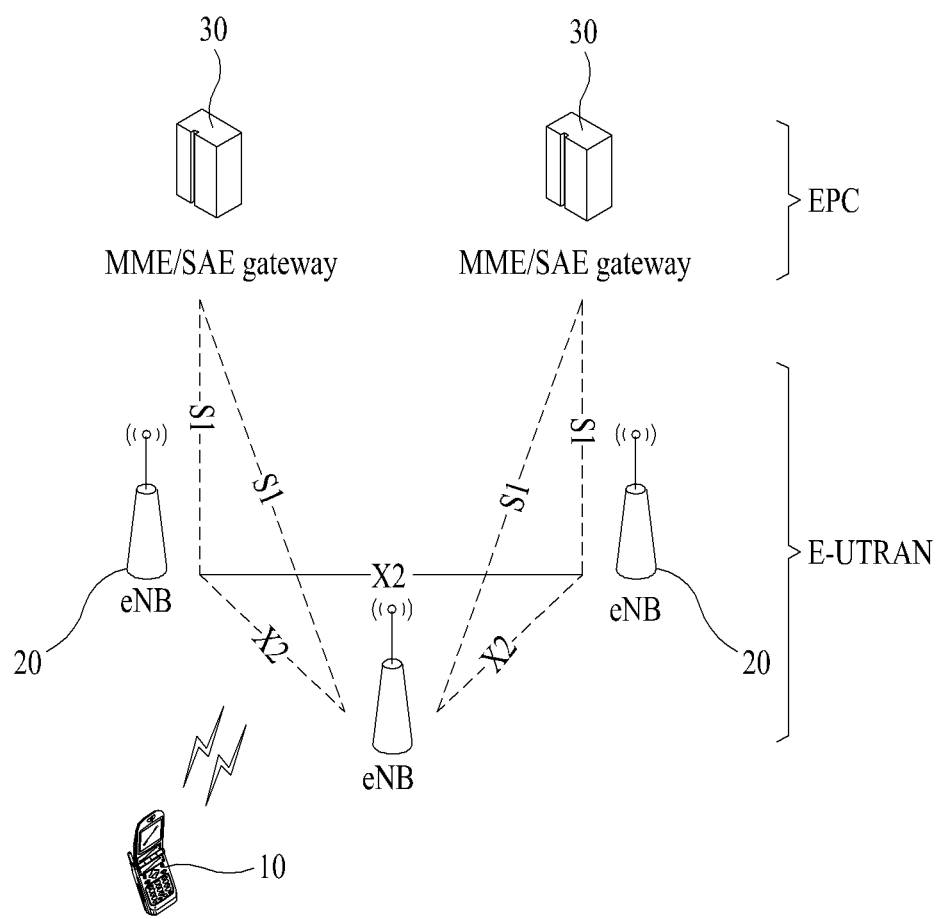
FIG. 1 is a diagram of an example for a network structure of E-UMTS.

FIG. 1 is a block diagram showing a network structure of E-UMTS. E-UMTS can be called an LTE system as well. A communication network provides various communication services such as an audio, a VoIP (Voice over IP) via an IMS (IP Multimedia Subsystem), and a packet data in a manner of being extensively arranged.

As shown in FIG. 1, E-UMTS network includes an evolved UMTS terrestrial radio access network (E-UTRAN), an evolved packet core (EPC) and more than one user equipment. E-UTRAN may be able to include at least one node B (eNB) 20 and a plurality of user equipments (UE) 10 can be positioned in a single cell. More than one E-UTRAN mobility management entity/system architecture evolution (MME/SAE) gateway 30 can be connected to an external network in a manner of being positioned at the end of a network.

In the present specification, 'downlink' indicates a communication from the eNB 20 to the UE 10 and 'uplink' indicates the communication from the UE to the eNB. The UE 10 is a communication device carried by a user and can be called a mobile station (MS), a user terminal (UT), a subscriber station (SS), or a wireless device.

The eNB 20 provides an end point of a user plane and a control plane to the UE 10. The MME/SAE gateway 30 provides the end point of a session and a mobility management function to the UE 10. The eNB 20 and the MME/SAE gateway 30 can be connected to each other via an S1 interface.

In general, the eNB 20 is a fixed station communicating with the UE 10 and can be called a base station (BS) or an access point. One eNB 20 can be assigned to every cell. An interface for transmitting a user traffic or a control traffic can be used between eNBs 20.

The MME performs various functions including a NAS signaling for the eNB 20, a NAS signaling security, an AS security control, an inter CN node signaling for mobility between 3GPP access networks, idle mode UE reachability (including a control and execution for a paging retransmission), tracking region list management (for an idle/active mode UE), selection of a PDN GW and a serving GW, MME selection for a handover with which a change of the MME is accompanied, SGSN selection for a handover heading to a 2G or 3G 3GPP access network, roaming, authentication, bearer management including a dedicated bearer configuration, a support for transmitting PWS (including ETWS and CMAS). An SAE gateway host provides various functions including a per-user based packet filtering (e.g., a use of a K packet test), a lawful interception, UE IP address assignment, transmission port level packet marking in downlink, UL and DL service level charging, gating and rating reinforcement, DL rate reinforcement based on APN-AMBR.

For clarity, the MME/SAE gateway 30 is simply called a 'gateway' in the present specification. Yet, the MME/SAE gateway 30 includes both the MME and the SAE gateway.

A plurality of nodes can be connected to each other between the eNB 20 and the gateway 30 via the S1 interface. The eNBs 20 can access to each other via an X2 interface and neighboring eNBs may have a mesh network structure having the X2 interface.

FIG. 2 is a block diagram of a structure of a general E-UTRAN and a general gateway 30. As shown in FIG. 2, the eNB 20 may be able to perform such functions as selecting for the gateway 30, routing to the gateway during an activation of a radio resource control (RRC), scheduling and transmitting a paging message, scheduling and transmitting a broadcast channel (BCCH) information, allocating a dynamic resource for the UEs 10 in both UL and DL, configuring and preparing an eNB measurement, controlling a radio bearer, a radio admission control (RAC), and a connectivity mobility control in a state of LTE_ACTIVE. In an EPC, the gateway 30 may be able to perform such functions as transmitting a paging, managing an LTE_IDLE state, user plane encryption, controlling a system architecture evolution (SAE) bearer, Non-Access Stratum (NAS) signaling encryption and an integrity protection.

Figure 3A:
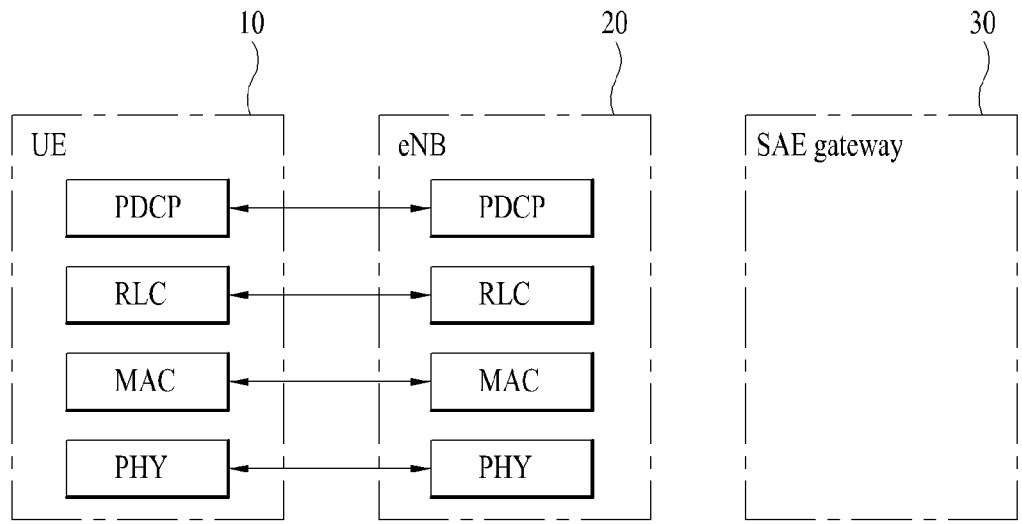
FIG. 3a and FIG. 3b are diagrams of examples of a user-plane and a control-plane protocol for E-UMTS.
Figure 3B:
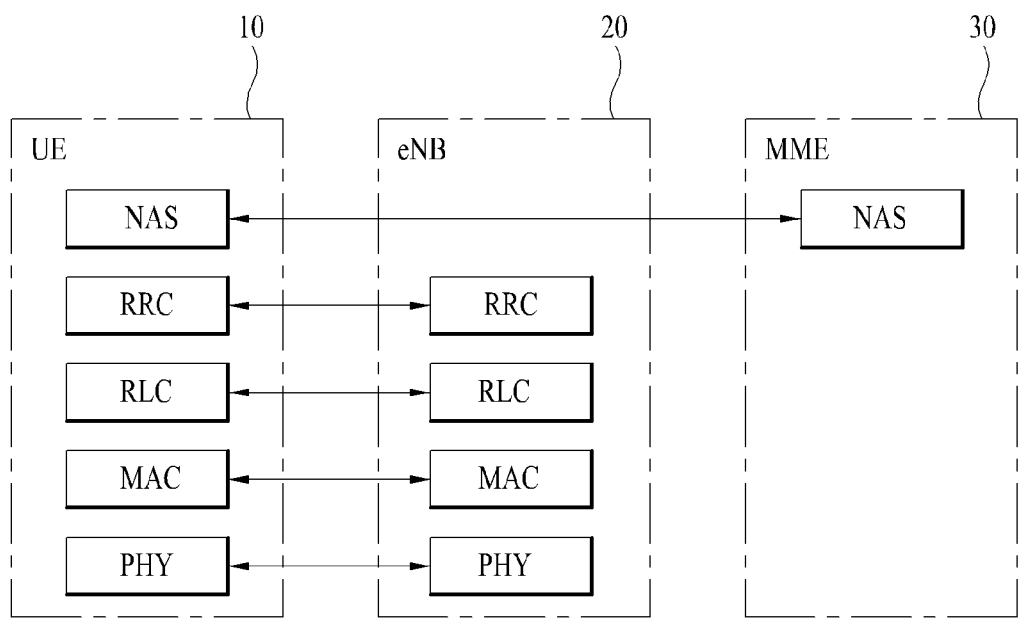

FIG. 3a and FIG. 3b are block diagrams of a user-plane protocol and a control-plane protocol stack for E-UMTS. As shown in FIG. 3a and FIG. 3b, protocol stacks can be classified into a $1^{st}$ layer (L1), a $2^{nd}$ layer (L2), and a $3^{rd}$ layer (L3) based on 3 lower layers of OSI (open system interconnection) model well known to a technical field of a communication system.

A physical layer, in particular, the $1^{st}$ layer (L1) provides an information transfer service to an upper layer using a physical channel. The physical layer is connected to a medium access control (MAC) layer situated at a higher level via a transport channel and a data is transmitted between the MAC layer and the physical layer via the transport channel. The data is transmitted between different physical layers, e.g., between the physical layer of a transmitting end and the physical layer of a receiving end via the physical channel.

The MAC layer belongs to a $2^{nd}$ layer and provides a service to a Radio Link Control (RLC) layer, which is a higher layer, via a logical channel. The RLC layer of the $2^{nd}$ layer supports a transmission of a trustworthy data. Although the RLC layer is not depicted in FIG. 3a and FIG. 3b, it is necessary to be cautious that the RLC layer is not required when the MAC layer performs an RLC function.

A PDCP layer belongs to the $2^{nd}$ layer and performs a header compression function to reduce unnecessary control information. By doing so, it enables the data using such an internet protocol (IP) packet as IPv4 or IPv6 to be efficiently transmitted via a radio interface having a relatively small bandwidth.

A radio resource control (RRC) layer situated at a lowest part of the $3^{rd}$ layer (L3) is defined in a control plane only and controls the logical channel, the transport channel, and the physical channel in relation to a configuration, re-configuration, and release of radio bearers (RBs). The RB indicates a service provided by the $2^{nd}$ layer (L2) to transmit data between the UE 10 and E-UTRAN.

As shown in FIG. 3a, the RLC and MAC layer are ended in the eNB 20 of a network side and may be able to perform such a function as scheduling, an automatic request for repetition (ARQ), and a hybrid ARQ (HARQ). A PDCP layer is ended in the eNB 20 of the network side and may be able to perform such a user plane function as a header compression, integrity protection, and encryption.

As shown in FIG. 3b, the RLC and MAC layer is ended in the eNB 20 of the network side and performs an identical function to that of the control plane. As shown in FIG. 3b, an RRC layer is ended in the eNB 20 of the network side and may be able to perform such functions as broadcasting, a paging, an RRC connectivity management, a radio bearer (RB) control, mobility function, and a UE 10 measurement report and control. As shown in FIG. 3b, a NAS control protocol is ended in the MME of the gateway 30 of the network side and may be able to perform such functions as SAE bearer management, authentication, LTE_IDLE mobility handling, LTE_IDLE paging transmission, and a security control for a signaling between the gateway and the UE 10.

An RRC state can be classified into an RRC_IDLE and RRC_CONNECTED, which are different from each other.

In the RRC_IDLE state, the UE 10 may be able to receive a broadcast of a system information and a paging information during a discontinuous reception (DRX) configured by the NAS, the UE may be able to be assigned an ID uniquely identifying the UE in a tracking region, and the UE may be able to perform a PLMN (Public Land Mobile Network) selection and a cell re-selection. In the RRC_IDLE state, no RRC context is stored in the eNB.

In the RRC_CONNECTED state, the UE 10 has an E-UTRAN RRC connection and a context in E-UTRAN. By doing so, it is able to transceive a data with the eNB. And, the UE 10 may be able to report a channel quality information and a feedback information to the eNB.

In the RRC_CONNECTED state, E-UTRAN recognizes a cell to which the UE 10 belongs thereto. Hence, a network transceives a data with the UE 10, the network may be able to control an Inter-RAT (Inter-Rat Access Technology) cell to a GERAN (GSM EDGE Radio Access Network) having a mobility of the UE (e.g., handover, NACC (Net-work Assisted Cell Change)), and the network may be able to perform a cell measurement for a neighboring cell.

In the RRC_IDLE mode, the UE 10 specifies a paging DRX (discontinuous reception) cycle. Specifically, the UE 10 monitors a paging signal on a specific paging occasion of every UE-specific paging DRX cycle.

FIG. 4 is a diagram of an example for a structure of a physical channel used in E-UMTS system. A physical channel consists of a plurality of subframes on a time axis and a plurality of sub-carriers on a frequency axis. In this case, one subframe includes a plurality of resource blocks and one resource block consists of a plurality of symbols and a plurality of sub-carriers. And, each subframe may be able to use specific sub-carriers of specific symbols (e.g., first symbol) of a corresponding subframe for a PDCCH (Physical Downlink Control Channel), in particular, the L1/L2 control channel. An L1/L2 control information transmission region (hatching part) and a data transmission region (not hatching part) are depicted in FIG. 4. In E-UMTS (Evolved Universal Mobile Telecommunications System) system currently under discussion, a radio frame of 10 ms is used. One radio frame consists of 10 subframes. And, one subframe consists of 2 contiguous slots. A length of one slot corresponds to 0.5 ms. One subframe consists of a plurality of OFDM symbols and a part (e.g., first symbol) of a plurality of the OFDM symbols can be used to transmit L1/L2 control information.

Figure 5:
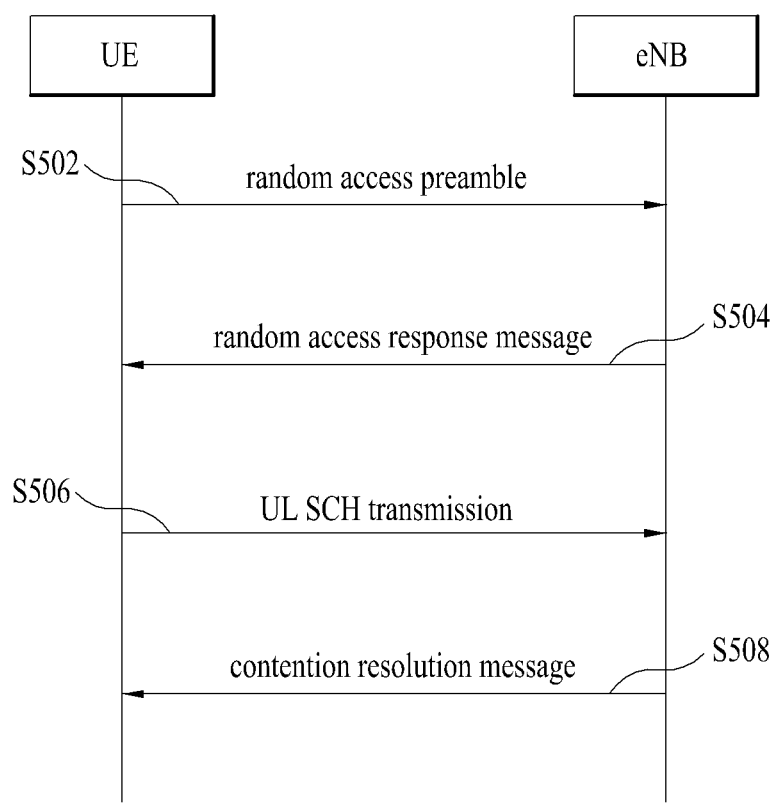
FIG. 5 is a diagram of an example of a random access procedure for E-UTRAN initial access.

FIG. 5 is a diagram indicating a random access procedure.

A random access procedure is used to transmit a data of a short length in uplink. For instance, the random access procedure is performed in case of an initial access in RRC_IDLE, an initial access after a failure of a radio link, a handover requiring the random access procedure, an occurrence of a UL/DL data, which requires the random access procedure in RRC_CONNECTED. A part of an RRC message including an RRC connection request message, a cell update message, an URA update message, and the like is transmitted using the random access procedure. A CCCH (Common Control channel), which is a logical channel, a DCCH (Dedicated Control Channel), a DTCH (Dedicated Traffic Channel) can be mapped to a transport channel RACH. The transport channel RACH is mapped to a PRACH (Physical Random Access Channel), which is a physical channel. If the MAC layer of a UE indicates a PRACH transmission to a physical layer of the UE, the physical layer of the UE transmits a PRACH preamble in UL in a manner of selecting one access slot and one signature. The random access procedure can be classified into a contention based procedure and a non-contention based procedure.

Referring to FIG. 5, the UE receives the information on a random access from the eNB via a system information and saves it. Thereafter, if the random access is necessary, the UE transmits a random access preamble (also called a message 1) to the eNB [S502]. If the eNB receives the random access preamble from the UE, the eNB transmit a random access response message (also called a message 2) to the UE [S504]. Specifically, DL scheduling information on the random access response message can be transmitted on the L1/L2 control channel (PDCCH) in a manner that a CRC is masked with an RA_RNTI (Random Access-RNTI). Having received a DL scheduling signal masked with the RA-RNTI, the UE receives the random access response message from a PDSCH (Physical Downlink Shared Channel) and may be able to decode it. Thereafter, the UE checks whether there exists random access response information indicated to the UE in the random access response message. Whether there exists random access response information indicated to the UE can be checked by whether there exists a RAID (Random Access preamble ID) for the preamble, which is transmitted by the UE. The random access response information includes a timing advance (TA) indicating a timing offset information for synchronization, a radio resource allocation information used for a UL, a temporary identifier (e.g., T-CRNTI) for UE identification, and the like. If the random access response information is received, the UE transmits a UL message (also called a message 3) on a UL SCH (Shared Channel) according to the radio resource allocation information included in the response information [S506]. After the UL message is received from the UE, the eNB transmits a contention resolution message (also called a message 4) to the UE [S508].

Figure 6:
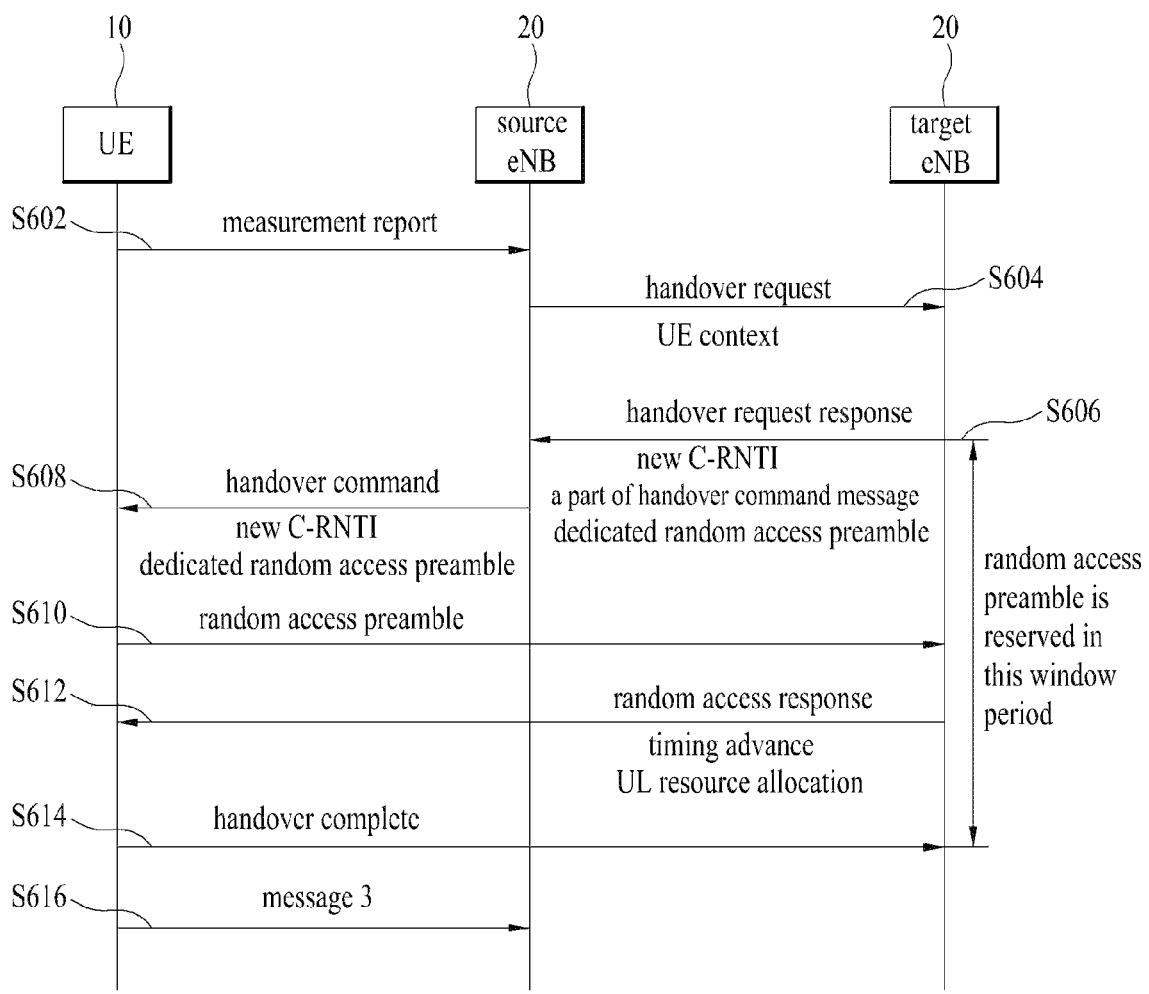
FIG. 6 is a diagram of an example of a handover process.

FIG. 6 is a diagram of a conventional handover procedure. A UE 10 transmits a measurement report to a source eNB 20 [S602]. The source eNB 20 transmits a handover request message to a target eNB together with a context of the UE 10 [S604].

The target eNB 20 transmits a handover request response to the source eNB [S606]. The handover request response includes a new C-RNTI, a part of a handover command message, and the information related to a random access such as a UE-dedicated access signature to perform a contention-free random access in a target cell. A signature is reserved at this timing point.

The source eNB 20 transmits a handover command to the UE [S608]. The handover command includes the new C-RNTI and the information related to the random access such as a dedicated signature, which is intended to be used by the UE. The handover command can be indicated by a transmission of an RRC connection re-configuration message having an MCI (Mobility Control Information).

The random access procedure is performed in a target cell after the handover command is received in order for the UE 10 to obtain a timing advance (TA) value. This random access procedure corresponds to the non-contention based procedure in that a signature is reserved by the UE 10 to avoid a contention.

The UE 10 transmits the random access preamble using a dedicated signature and then the target eNB 20 starts the random access procedure [S610]. The target eNB 20 transmits a random access response message to the UE 10 [S612]. The random access response message includes the TA and a UL resource allocation. The UE 10 transmits a handover complete message to the target eNB 20 [S614].

Figure 7:
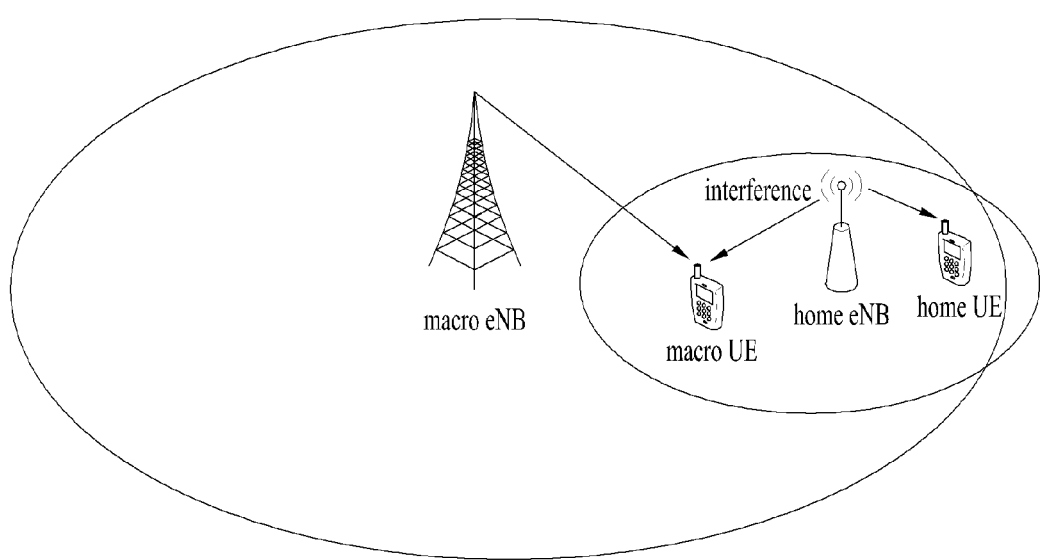
FIG. 7 is a diagram of an example of a heterogeneous network including a macro cell and a micro cell.

FIG. 7 is a diagram of a heterogeneous network including a macro cell and a micro cell. According to a next generation communication standard including 3GPP LTE-A, a heterogeneous network where a micro cell having a low transmit power exists within a coverage of a legacy macro cell in a manner of being overlapped is under discussion.

Referring FIG. 7, a macro cell can be overlapped with more than one micro cell. A service of the macro cell is provided by a macro eNB (Macro eNode B, M eNB). In the present specification, the macro cell and the macro eNB can be used in a manner of being mixed. A UE accessed the macro cell can be called a macro UE (Macro UE, MUE). The macro UE receives a signal from the eNB and transmits the signal to the macro eNB.

The micro cell can also be called a femto cell or a pico cell. A service of the micro cell is provided by a pico eNB (Pico eNode B), a femto eNB (Femto eNode B), a home eNB (Home eNode B, HeNB), a relay node (RN), or the like. For clarity, an example of a case that the home eNB is positioned within the macro cell is depicted in the diagram. Unless there is a special distinction in the present specification, the micro eNB, the micro cell, the pico eNB, the pico cell, the femto eNB, the femto cell, the home eNB, a home cell, the relay node, a relay cell can be used in a manner of being mixed. The UE accessed the micro cell can be called a micro UE, a pico UE (PUE), a femto UE (FUE), a home UE (HUE) or the like. The micro UE receives a signal from the micro eNB (e.g., femto eNB, pico eNB) and transmits the signal to the micro eNB.

The micro cell can be divided into an OA (open access) cell and a CSG (closed subscriber group) cell according to reachability. The OA cell indicates the micro cell that a UE is able to receive a service from the micro cell whenever the UE wants if necessary without any separate access limit. On the other hand, the CSG cell indicates the micro cell that only a granted specific UE is able to receive a service from the micro cell. For instance, to access a CSG cell can be granted to a specific UE, which is allowed by a membership and the like.

Since the macro cell is overlapped with the micro cell in a heterogeneous network, inter-cell interference becomes more serious problem. As shown in FIG. 7, in case that the macro UE is positioned at the boundary of the macro cell and the micro cell, a DL signal of the micro eNB may affect the macro UE as interference. Similarly, a DL signal of the macro eNB may affect the micro UE within the micro cell as interference. And, a UL signal of the macro UE may affect the micro eNB as interference. Similarly, a UL signal of the micro UE may affect the macro eNB as interference.

In case of the heterogeneous network including the macro and the micro cell, the macro cell may cause a strong interference for the UE positioned within the micro cell, in particular, the micro UE positioned at the boundary of the micro cell. Hence, it is required a method of cancelling UL/DL interference for a data, L1/L2 control signal, a synchronization signal, and a reference signal. An inter-cell interference cancellation (ICIC) method can be treated in a time, frequency, and/or a spatial domain.

In the following description, the ICIC is explained in more detail. For clarity, in case that the macro cell is overlapped with the micro cell, assume that a target of protecting from an inter-cell interference corresponds to a pico UE. In this case, a network node causing the interference corresponds to the macro cell (or the macro eNB).

The macro cell causing the inter-cell interference may be able to configure an ABS (Almost Blank Subframe) in a radio frame in order to cancel the inter-cell interference. The ABS indicates a subframe configured not to transmit a normal DL signal except a specific DL signal. The specific DL signal includes a CRS (Cell-specific Reference Signal or Cell-common Reference Signal) although the specific DL signal may be non-limited to the CRS. The ABS can be repeated to have a constant pattern within more than one radio frame. Although it may be non-limited to the following description, the macro cell informs the micro cell of an ABS configuration (e.g., ABS assignment pattern) via a backhaul and the micro cell may be able to schedule the micro UE using the ABS configuration. For instance, the micro UE can be scheduled only in an ABS interval. And, a CSI (Channel State Information) measurement of the micro UE can be performed only in the ABS. The ABS assignment pattern can be indicated using a bitmap. In this case, each bit indicates whether a corresponding subframe corresponds to the ABS. A cell list to which the ABS is applied can be signaled together with the ABS configuration.

As mentioned in the foregoing description, in case that an interfered UE is configured to perform a measurement for an RLM (Radio Link management)/RRM (Radio Resource management) only in a limited subframe (e.g., ABS), it is able to prevent from unnecessary RLF (Radio Link Failure) and may be able to precisely measure RSRQ (Reference Signal Received Quality) and RSRP (Reference Signal Received Power).

And, in case that the UE measures a signal of the interfered cell in the ABS, since a signal of an interfering cell is considerably removed, it may get an effect of enlarging a coverage of the interfered cell. This is called a CRE (Cell Range Expansion).

An ICIC scenario may vary according to a network configuration (e.g., reachability of the micro cell). For instance, the ICIC scenario may vary in case of the macro cell—OA cell and in case of the macro cell—CSG cell. In case of the OA cell, since all UEs within the macro cell are permitted to access, a handover can be freely performed between the macro cell and the OA cell and a network may be able to move a macro UE to the OA cell with the purpose of distributing a load and the like. Hence, in case of the macro cell—OA cell, it is preferable to put priority to protection and reachability of the OA cell. To this end, the ABS is set to the macro cell and the UE measures a signal of the OA cell using the ABS of the macro cell. Consequently, an effect of enlarging the coverage of the OA cell within the macro cell occurs.

On the other hand, in case of the CSG cell, only a specific cell is allowed to access and general UEs within the macro cell are not allowed to access. Hence, if priority is put to the protection of the CSG cell, a majority of UEs are sacrificed for a minority of the specific UE. Hence, in case of the macro cell—CSG cell, the ABS is set to the CSG cell and the UE measures a signal of the macro cell using the ABS of the CSG cell. Consequently, an effect of reducing the coverage of the CSG cell within the macro cell occurs.

Figure 8:
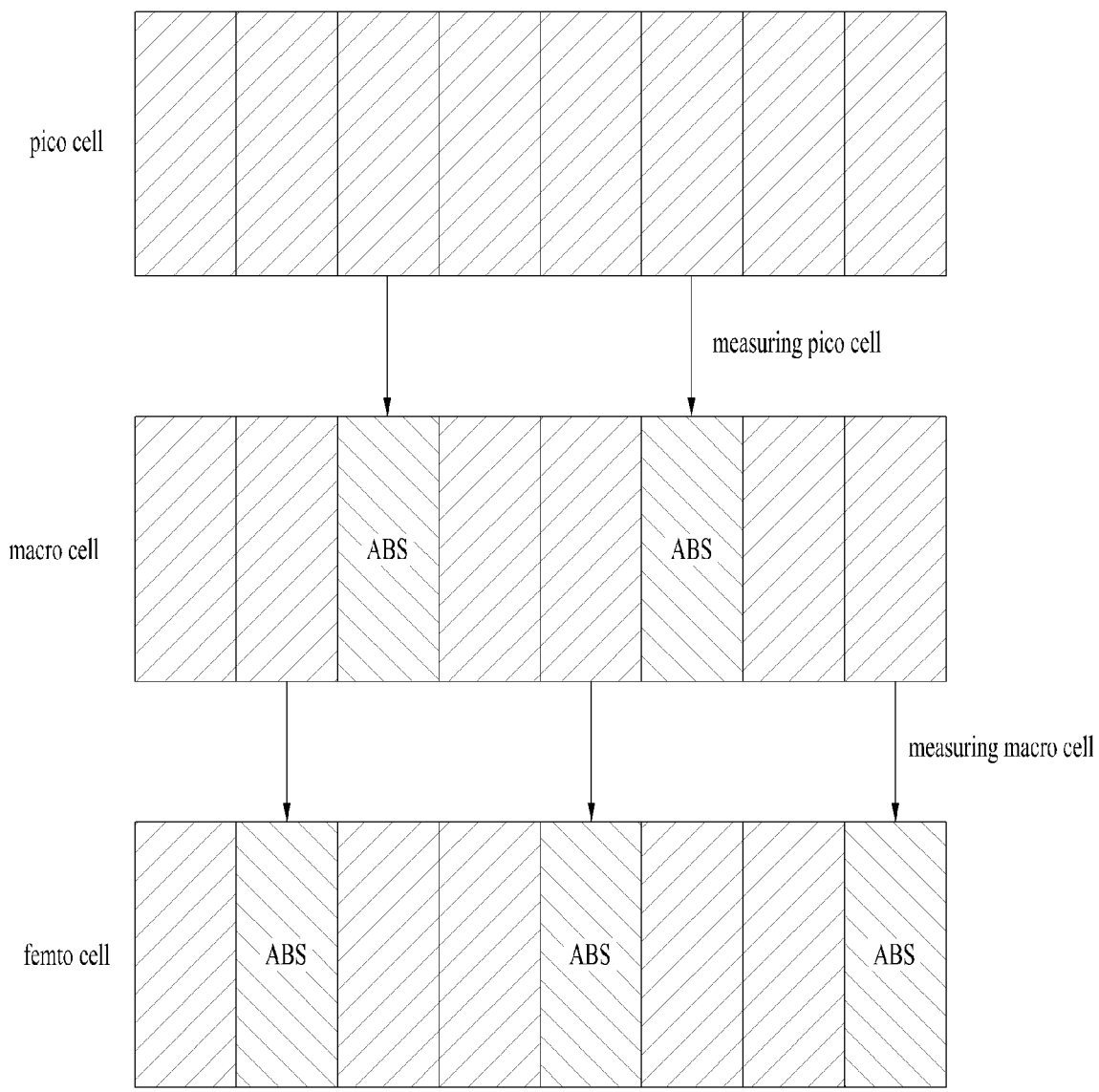
FIG. 8 is a diagram of an example of a legacy ICIC scenario according to a network configuration.

FIG. 8 is a diagram of an example of a legacy ICIC scenario according to a network configuration. In general, a pico cell is used as an OA cell and a femto cell is used as a CSG cell in 3GPP. In the following description, unless there is a special mention, assume that the pico cell and the OA cell are used in a manner of being mixed and the femto cell and the CSG cell are used in a manner of being mixed.

Referring to FIG. 8, following operations can be performed according to a network configuration.

In case of the macro cell—pico cell (or OA cell):

a) A UE (pico UE, PUE) getting a service from the pico cell may be able to measure a signal of the serving pico cell using an ABS of the macro cell. Consequently, from the PUE point of view, an effect of expanding the coverage of the pico cell occurs. (Pico CRE)

b) In order to precisely measure a signal of a pico cell, which is interfered by a signal of the macro cell, (in particular, in order to enable an in-bound shift to a pico cell having a weak signal), a UE (macro UE, MUE) getting a service from the macro cell may be able to measure a signal of a neighboring pico cell using an ABS of the macro cell. Consequently, from the MUE point of view, an effect of expanding the coverage of the pico cell occurs. (Pico CRE)

In case of the macro cell—femto cell (or CSG cell):

c) In order to continuously receive a service from the macro cell, which is under a strong interference from the femto cell, the MUE may be able to measure a signal of the serving macro cell using the ABS of the femto cell. Consequently, from the MUE point of view, an effect of reducing the interference of the femto cell within the macro cell (in particular, the effect of reducing the coverage of the femto cell) occurs.

Although FIG. 8 shows a case that the macro cell is not overlapped with the ABS of the femto cell, this is just exemplary. The macro cell and the ABS of the femto cell may be overlapped with each other at least a part. Yet, when it considered that a data scheduling for the MUE is performed in a subframe of the macro cell corresponding to the ABS of the femto cell, it is preferable that the macro cell is not overlapped with the ABS of the femto cell with each other.

Although the present example shows a scenario that a case of macro cell—pico cell and a case of macro cell—femto cell are mixed with each other, this is just exemplary. The macro cell—pico cell and the macro cell—femto cell can be configured individually.

Embodiment: selective use and re-use of ABS for enhancing mobility

As mentioned earlier with reference to FIG. 8, in case of the macro cell—femto cell (or CSG cell), the ABS is set to the femto cell in order to protect the macro UE (MUE) from the interference of the femto cell and the MUE measures a signal of the macro cell using the ABS of the femto cell. Yet, since the macro cell includes the UE allowed to access the femto cell (for clarity, a granted UE) and the UE not allowed to access the femto cell (for clarity, non-granted UE) in a manner of being mixed, if all UEs are configured to measure a signal of the macro cell using the ABS of the femto cell, accessing the femto cell of a specific UE can be restricted although the specific UE is allowed to access the femto cell.

Hence, in case of the macro cell—femto cell (or CSG cell), the present example proposes that ABS application of a corresponding UE is differently performed according to whether an access for the femto cell is allowed. Specifically, in case of a non-granted UE, the UE may be able to measure a signal of the serving macro cell using the ABS of the femto cell as it was performed in a related art. On the other hand, in case of a granted UE, the UE may be able to measure the signal of the macro cell either using the ABS of the femto cell or not considering the ABS of the femto cell according to whether a prescribed condition is satisfied. According to an example of implementation, the granted UE may be able to measure the signal of the femto cell using the ABS of the macro cell to expand coverage of the femto cell. According to an example of implementation, if the prescribed condition is satisfied, the granted UE may be able to specify a signal of the macro cell after removing ABS assignment information of the femto cell, which is stored in the UE.

In this case, the prescribed condition may include a case that the granted UE recognizes the femto cell. For instance, in case that an MUE is able to sense a signal of the femto cell (with a strength more than a specific value) and is allowed to access the femto cell, the MUE may be able to measure the signal of the macro cell without considering the ABS of the femto cell. And, the prescribed condition may include case that the granted UE informs the macro cell of the femto cell. For clarity, assume that the information on the femto cell (e.g., whether it exists or not, a cell ID, and the like) is transmitted via a proximity indication (tentative name). Hence, the granted UE transmits the proximity indication to the macro cell and may be then able to measure the signal of the macro cell without considering the ABS of the femto cell. And, the prescribed condition may include a case that the granted UE obtains an ABS configuration of the macro cell. Although it may be non-limited to this, after receiving the proximity indication from the granted UE, the macro cell may be able to transmit the ABS configuration (e.g., ABS assignment information) of the macro cell to the granted UE. Hence, in case of obtaining the ABS configuration of the macro cell, the granted UE may be able to measure the signal of the macro cell without considering the ABS of the femto cell.

And, in case that a UE stores an ABS pattern to measure a signal of a specific cell in a cell 1 and then moves to a cell 2 but, the UE does not receive the ABS pattern to measure the signal of the specific cell from a cell 2, the present example proposes that the UE continuously stores and uses the ABS pattern received from the cell 1 to measure the signal of the specific cell after the UE moves to the cell 2 in order to efficiently manage the ABS assignment information.

Figure 9:
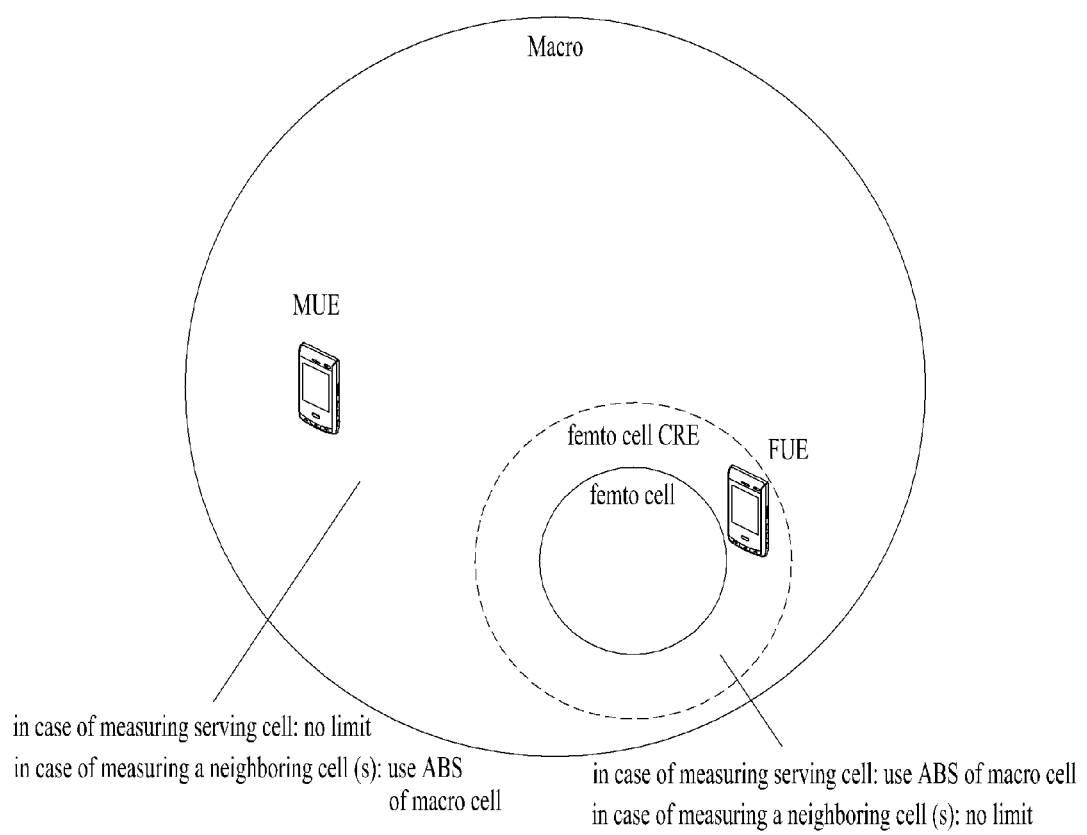
FIG. 9 is a diagram of an example of an ICIC scenario according to an embodiment of the present invention.

FIG. 9 is a diagram of an example of an ICIC scenario according to an embodiment of the present invention.

Referring to FIG. 9, the UE allowed to access the femto cell may be able to selectively use the ABS of the femto cell as proposed in the above. Specifically, an MUE allowed to access a femto CSG cell does not use the ABS of the femto cell in case of measuring a serving macro cell and may be able to use the ABS of the macro cell in case of measuring a neighboring cell (in particular, the femto cell). And, having accessed the femto CSG cell, a FUE uses the ABS of the macro cell in case of measuring the serving femto cell and may not use the ABS of the femto cell in case of measuring a neighboring cell (in particular, the macro cell). In particular, the UE, which accessed the femto CSG cell or the UE allowed to access the femto CSG cell may be able to selectively use the ABS of the femto cell according to a condition in case of measuring the signal of the macro cell. And, the UE, which accessed the femto CSG cell or the UE allowed to access the femto CSG cell may be able to use the ABS of the macro cell to measure a weak signal of the femto cell. Consequently, the coverage of the femto cell can be expanded as shown in FIG. 9 with a dotted line (femto CRE).

A summary of the ICIC scenario in FIG. 9 is as follows.

A UE allowed to access a femto cell may be able to use an ABS of a macro cell for a femto CRE in case of measuring a signal of the femto cell. Meanwhile, the UE allowed to access the femto cell may be able to selectively use the ABS of the femto cell in case of measuring a signal of the macro cell.

A UE not allowed to access the femto cell uses the ABS of the femto cell to measure a signal of a serving macro cell and does not use the ABS of the macro cell for the femto CRE.

Having accessed the femto cell, a FUE may be able to use the ABS of the macro cell to measure a weak signal of a serving femto cell.

In order to precisely measure a weak signal of the femto cell, which is interfered by the macro cell, a MUE allowed to access the femto cell may be able to use the ABS of the macro cell to measure a signal of a neighboring femto cell.

Figure 10:
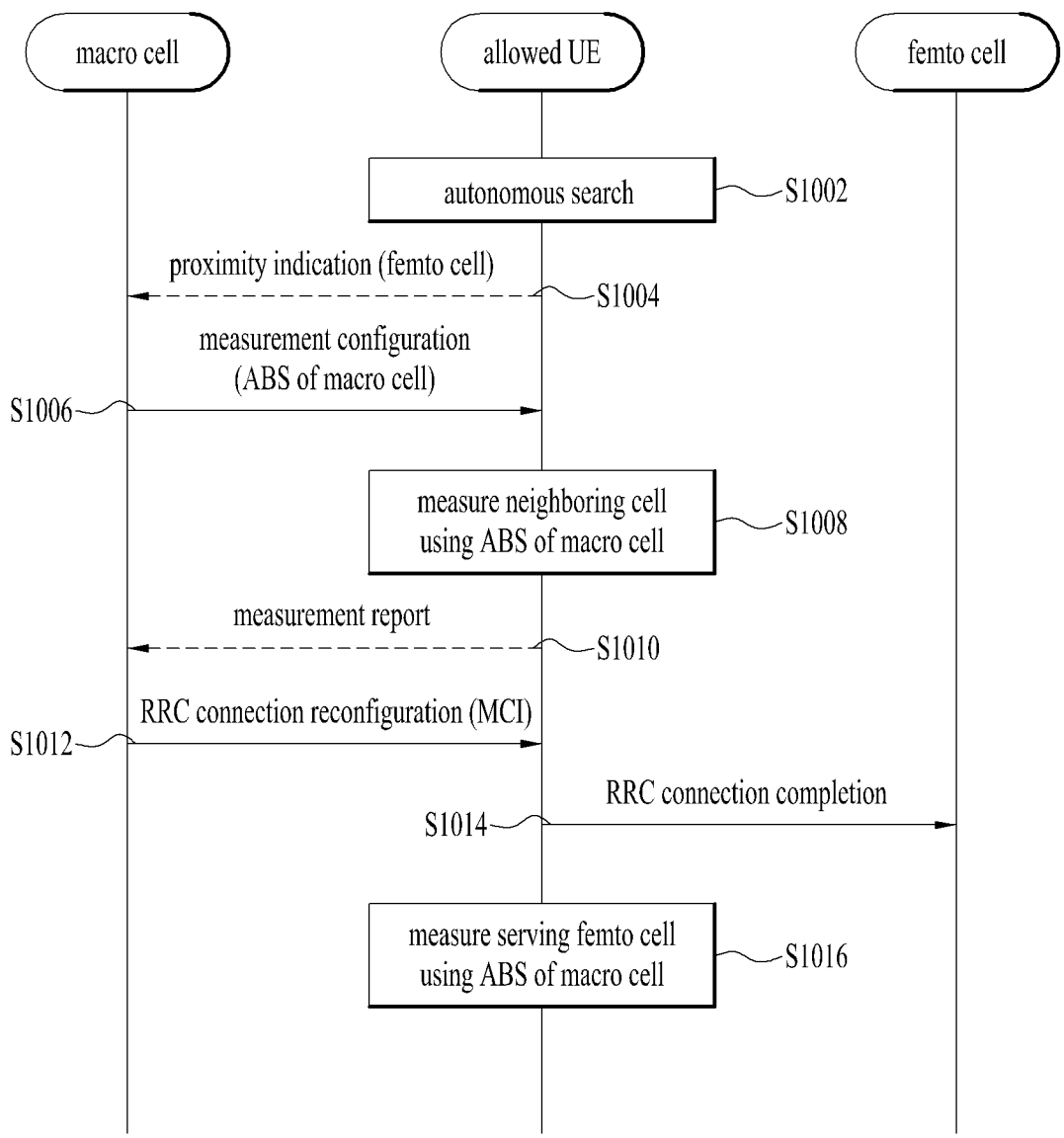
FIG. 10 is a diagram of an example of an ICIC operation for a macro-femto cell.

FIG. 10 is a diagram of an example of an ICIC operation for a macro-femto cell. Referring to FIG. 10, the ICIC operation according to the present example can be performed in the following order.

1. A UE performs an autonomous search and may be able to find out a femto cell [S1002]. In case that the UE has information on an ABS of the femto cell, the UE may be able to measure a signal of a serving macro cell using the ABS of the femto cell to avoid interference from the femto cell.

2. In case that the UE is allowed to access the femto cell, the UE may be able to transmit a proximity indication to the macro cell to indicate that the femto cell is near the macro cell [S1004]. Thereafter, the UE allowed to access the femto cell may be able to measure a signal of a serving macro cell without using the ABS of the femto cell. In some cases, the UE may be able to delete ABS configuration information (e.g., ABS pattern information) of the femto cell stored in the UE after transmitting the proximity indication.

3. In order for the UE to measure a signal of the femto cell using the ABS of the macro cell, the macro cell may be able to transmit an RRC connection re-configuration message including a measurement configuration containing ABS assignment information of the macro cell [S1006]. In this case, the measurement configuration containing ABS assignment information of the macro cell can be used for the purpose of indicating a removal of the ABS of the femto cell, which is set to the UE, from the UE. The UE stores the ABS assignment information of the macro cell and the measurement configuration. If the measurement configuration indicates the removal of the ABS of the femto cell, which is set to the UE, the UE may be able to remove the configuration on the ABS of the femto cell.

4. the UE measures a signal of the femto cell using the ABS of the macro cell [S1008] or may be able to measure the signal of the macro cell without using the ABS of the femto cell according to the above mentioned configuration (not depicted).

5. If a signal quality of the femto cell is good enough to perform a handover, the UE may be able to report a measurement result for the femto cell to the macro cell [S1010].

6. The macro cell may be able to command the UE to perform a handover in a manner of transmitting an RRC connection re-configuration message including an MCI (Mobility Control Information) to the UE [S1012]. If the RRC connection re-configuration message includes the information on the ABS (pattern) of the macro cell to measure the signal of the femto cell, the UE may be able to replace the stored information on the ABS (pattern) of the macro cell with the information on the ABS (pattern) of the macro cell included in the RRC connection re-configuration message. On the other hand, if the information on the ABS (pattern) of the macro cell is not included in the RRC connection re-configuration message, the UE may be able to continuously maintain the previously stored information on the ABS (pattern) of the macro cell after a handover to the femto cell is completed.

7. The UE may be able to complete a handover in a manner of transmitting an RRC connection reconfiguration complete message to the femto cell [S1014].

8. The UE may be able to measure a signal of the femto cell using the ABS of the macro cell [S1016]. The information on the ABS (pattern) of the macro cell can be given by the measurement configuration information of the macro cell or a handover command (in particular, the RRC connection reconfiguration message including the MCI).

Compared to the macro—pico scenario, the macro cell may be able to know that the UE is allowed to access the femto cell in a manner of receiving a proximity indicator before the ABS of the macro cell is given to measure a signal of the femto cell.

Figure 11:
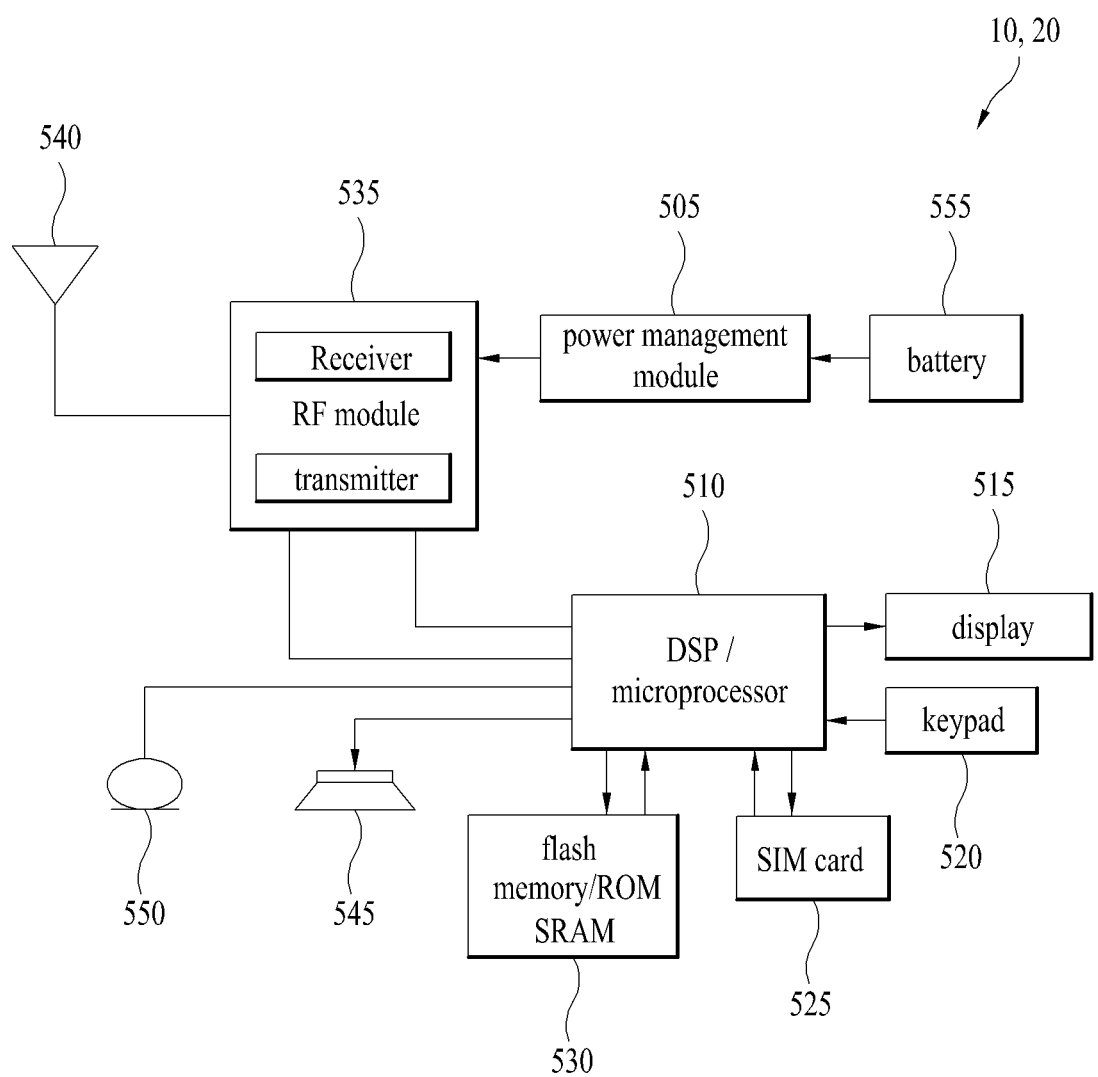
FIG. 11 is a diagram of an example of a communication device (e.g., a user equipment, a base station) used for a communication system exemplified by the present invention.

FIG. 11 is a diagram of an example of a communication device (e.g., a user equipment, a base station) used for a communication system exemplified by the present invention. For clarity, FIG. 11 is depicted by mainly concerning a mobile station (MS) or a UE 10, FIG. 15 can be used as a block diagram of an eNB in a manner of modifying a part of configuration.

Referring to FIG. 11, the UE 10 includes a processor (or a digital signal processor) 510, an RF module 535, a power management module 505, an antenna 540, a battery 555, a display 515, a keypad 520, a memory 530, a SIM card 525 (optional), a speaker 545, and a microphone 550.

For instance, a user pushes buttons of the keypad 520 or inputs an indication information such as a telephone number by an audio operation using the microphone 550. The micro processor 510 is configured to perform an appropriate function such as a dialing a telephone number in a manner of receiving and processing the indication information. An operation data may be able to perform a function in a manner of being extracted from the subscriber identity module (SIM) card 525 or the memory module 530. And, the processor 510 may be able to show an indication and operation information in the display 515 for a reference and convenience of the user.

For instance, the processor 510 is configured to provide the indication information to the RF module 535 and starts a communication such as transmitting a radio signal including an audio communication data. The RF module 535 includes a receiver and a transmitter to transmit and receive the radio signal. The antenna 541 is configured to facilitate transmission and reception of the radio signal. If a radio signal is received, the RF module 535 is configured to forward and convert the signal into a base band frequency for a process of the processor 510. The processed signal is converted into a information capable of being heard and read and outputted via the speaker 545. The processor 510 includes a protocol and functions necessary for performing various processes described in the present specification.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a UE and an eNB. In this disclosure, a specific operation explained as performed by an eNB can be occasionally performed by an upper node of the eNB. In particular, in a network constructed with a plurality of network nodes including an eNB, it is apparent that various operations performed for communication with a user equipment can be performed by an eNB or other networks except the eNB. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

And, it is apparently understandable that an embodiment is configured by combining claims failing to have relation of explicit citation in the appended claims together or can be included as new claims by amendment after filing an application.

Industrial Applicability

Accordingly, the present invention can be used by such a wireless communication device as a user equipment, a relay, an eNB, and the like.

What is claimed is:

1. A method of measuring a signal at a User Equipment (UE) in a wireless communication system, the method comprising:
   receiving an information of a first specific subframe from a first cell in a state of being established a connection with the first cell, the first specific subframe being a subframe configured to restrict in receiving a downlink signal from a second cell;
   receiving a signal of the first cell on the first specific subframe based on the information if the UE is not allowed to access to the second cell; and
   receiving a signal of the first cell regardless of the first specific subframe if the UE is allowed to access to the second cell,
   wherein the UE is considered to be allowed to access to the second cell if the UE informs the first cell of a proximity of the second cell.

2. The method of claim 1, wherein the second cell is a femto cell to which the user equipment is allowed to access or a Closed Subscriber Group (CSG) cell to which the user equipment is allowed to access.

3. The method of claim 1, wherein if the first cell orders to remove the information, the user equipment does not use the information on the first specific subframe.

4. The method of claim 1, further comprising:
   receiving an information of a second specific subframe configured to restrict in receiving a downlink signal from a first cell, after informing the first cell of the proximity of the second cell and
   receiving a signal of the second cell via the second specific subframe based on the information of the second specific subframe.

5. A User Equipment (UE) for use in a wireless communication system, comprising:
   a radio frequency (RF) unit; and
   a processor, configured to:
      receive an information of a first specific subframe from a first cell in a state of being established a connection with the first cell, the first specific subframe being a subframe configured to restrict in receiving a downlink signal from a second cell;
      receive a signal of a first cell via the first specific subframe based on the information if the UE is not allowed to access to the second cell; and
      receive a signal of the first cell regardless of the first specific subframe if the UE is allowed to access to the second cell,
      wherein the UE is considered to be allowed to access to the second cell if the UE informs the first cell of a proximity of the second cell.

6. The user equipment of claim 5, wherein the second cell is a femto cell to which the user equipment is allowed to access or a Closed Subscriber Group (CSG) cell to which the user equipment is allowed to access.

7. The user equipment of claim 5, wherein if the first cell orders to remove the information, the user equipment does not use the information on the first specific time region.

8. The user equipment of claim 5, wherein the processor is further configured to:
   receive an information of a second specific subframe configured to restrict receiving a downlink signal from a first cell after informing the first cell of the proximity of the second cell; and
   receive a signal of the second cell via the second specific subframe based on the information of the second specific subframe.

* * * * *